Oct. 5, 1965   W. F. DAVIS ETAL   3,210,104
METHOD AND MEANS FOR SECURING THE HUB
OF MACHINE ELEMENTS TO SHAFTS
Filed Oct. 3, 1958

INVENTORS
Frank T. Davis,
William F. Davis

United States Patent Office 3,210,104
Patented Oct. 5, 1965

3,210,104
METHOD AND MEANS FOR SECURING THE HUB OF MACHINE ELEMENTS TO SHAFTS
William F. Davis, and Frank T. Davis, Windsor, N.J.
(Both of P.O. Box 179, Highstown, N.J.)
Filed Oct. 3, 1958, Ser. No. 765,260
5 Claims. (Cl. 287—52)

The present invention relates to new and useful improvements in the method and means of securing hubs of machine elements to shafts and/or journals.

Objects and advantages of the invention will be set forth in part hereinafter and in part will be obvious herefrom, or may be learned by practice with the invention, the same being realized and attained by the instrumentalities and combinations pointed out in the appended claims.

The invention consists in the novel parts, constructions, arrangements, combinations and improvements herein disclosed and described.

The accompanying drawing, referred to herein and constituting a part hereof, illustrate the embodiments of the invention and together with the description, serve to explain the principles of the invention.

The present invention has for its object the provision of a novel and improved method of securing the hub of a machine elements to shafts and/or journals.

The prime object of the present invention is to provide a means of securing the hub of machine members to shafts without the employment of keys, pins, force fits and other such devices.

A second object of the invention is to provide a means of securing the hub of machine members to shafts which permits rapid and easy removal of the hub from the shaft without damage to either member.

Another object of the present invention is to provide a means of securing the hub of machine elements to shafts in a manner that precludes stress concentrations prevalent in shrink or interference fit methods now in use.

A further object is to provide a means of securing the hubs of machine elements to shafts in such a way that insures the concentric relationship of the hub and its element relative to the surface of the shaft.

Other objects and advantages will become apparent to those skilled in the art.

While the invention is susceptible of various modifications and alternate constructions and uses, we have depicted in the drawings and disclosed in detail herein preferred embodiments of the invention.

It is to be understood, however, that the broader aspects of the invention are not limited to the specific mechanisms shown and described but departures may be made therefrom within the spirit and scope of the accompanying claims without sacrificing its concomitant benefit and advantages. Therefore, we do not intend to limit the invention by the aforementioned drawings and description but intend to cover all modifications and alternate constructions falling within the spirit and scope of the invention as expressed in the appended claims.

Referring to the drawings.

It is understood that the foregoing description and the following detailed description as well are exemplary and explanatory of the invention but are not restrictive thereof.

Figures 1, 5:
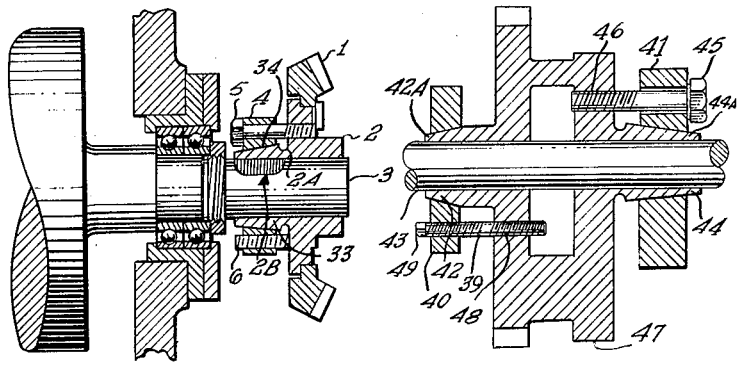
FIGURE 1 is a diagrammatic cross section presentation of the present invention as applied to the hub of a gear and the end of a cylinder journal or shaft.
FIGURE 5 is a sectional illustration of the present invention in a modified construction.

Referring to FIGURE 1, the bevel gear rim 1 is mounted on the gear hub 2 which, in turn, is mounted on shaft 3. The hub has a bored hole which accepts shaft 3 with a snug sliding fit which permits accurate positioning of the gear on said shaft 3. The hub also has a relatively thin wall section 33 at the tapered 34 or conical end which can be readily deflected radially with the application of sufficient radial force. A ring 4, which has a tapered bore to match the taper-surface of the hub, is provided with a thick walled section to minimize radial expansive deflections. The ring 4 is also provided with two sets of axial holes; one set being threaded to coact with jack screws 6 to move the ring away from the hub and off the taper 34 of the hub 2, the second set of holes accepts bolts 5 and thereby transfers to the ring 4 the thrust, developed by advancing the screw or bolt 5 into its coacting threaded hole in hub 2. The thrust force produced by bolts 5 causes ring 4 to advance on the taper 34 of hub 2 thereby creating a radial force between the thin wall section 33 of the hub 2 and the thick wall of the ring 4. This force of necessity produces radial deflections in the two members which are in inverse proportion to their section areas. Since the hub has a small section area it freely deflects until it contacts the surface of the shaft, removing the clearance which had existed due to the sliding fit condition which permitted rapid and easy assembly and positioning of the hub on the shaft, and then transfers the radial force to the shaft 3. The construction of the parts 5, 4 and 2 are such as to afford a high mechanical advantage which is compounded. The mechanical advantage of the screw multiplied by the mechanical advantage of the wedge action of the taper on hub 2 and ring 4, produce a very high radial force with the application of small turning effort on the bolt 5.

The radial force which now exists between the hub, under the thin walled section 33 and the shaft results in a high frictional locking force, not unlike that of a shrink fit, and secures the hub to the shaft both axially and torsionally.

This force between the shaft 3 and the hub 2 can be readily controlled to provide a load distribution which precludes the concentration of stresses in the shaft, which is prevalent in constructions employing shrink fits between the hub and the shaft. As depicted in FIGURE 1 the ring 4 has been made shorter in length than the tapered section 34 of the hub 2. The result of this configuration is the distribution of the radial forces thru the hub section 33 to provide a transfer of the radial force to the shaft in a distribution pattern which starts with zero force and gradually increases to the maximum force applied, remains at this valve along the greater length of the loaded area and then gradually diminishes to zero. Reference character 2B depicts the load distribution along the loaded length of shaft.

It is clear that the removal of the radial load, by use of the jack screws 6 to separate the ring 4 from the hub 2, eliminates the lock (frictional) between the shaft and the hub and thereby again permits rapid and easy disassembly, reassembly and/or repositioning of the hub on the shaft. It is also clear that all the components of the construction are in no way injured or damaged and therefore facilitate adjustments and maintenance operations.

It is to be further noted that the locking forces are applied in a manner which does not in any way disturb the setting, or positioning, of the hub on the shaft and therefore permits very accurate location of the machine elements. As in the illustration of FIGURE 1 the locating of a bevel gear is achieved for both proper tooth contact and machine timing, without the need of other devices and methods now in general use.

It has been found advantageous in some designs of the described hub construction to include a reduction in section area as shown at 2A in FIGURE 1, to provide greater flexibility of the tapered portion of the hub 2, however this is useful and necessary only on designs which are limited by considerations other than those generally encountered.

Figure 2:
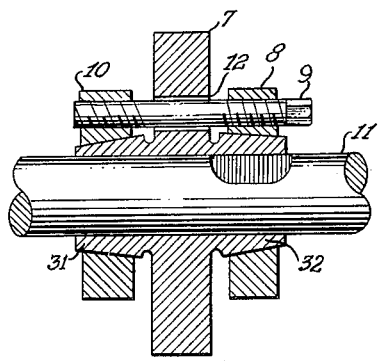
FIGURE 2 is a diagrammatic cross section of an alternate construction as applied to the hub of an integral cam mounted on a shaft.

Referring to FIGURE 2, this illustrative embodiment depicts a machine element, in this case a cam 7, secured to a line shaft by the employment of a modification of the present invention. In this case the cam has a integral hub which extends from each side of the cam. The extensions of the cam hub 7 are tapered or conical as depicted by characters 31 and 32 on their outer diameter to coact with the thick walled rings 8 and 10. The hub has been bored to provide a free sliding condition on the line shaft 11, as in the previous case. The rings 8 and 10 are provided with sets of tapped holes to accept the threaded rod 9, which passes thru an aperture 12 in the hub's flange. Said holes and threaded rod are provided with different pitch characteristic at each ring so that rotation of said threaded rod will move the rings 8 and 10 toward each other or away from each other. The transfer of forces and locking action is the same as in the first disclosed example with the exception that two points are secured to the shaft thereby doubling the locking of the hub to the shaft and providing for twice the restraint to applied loads. The rings 8 and 10 can be readily removed in this configuration with the same threaded rod which was used to apply the locking thrust loads. The utilization of the differential threaded rod 9 is well suited to applications requiring very high torque capacities. In other cases the threaded rod 9 may be provided with threads of opposite hand and thereby increase the speed of locking or unlocking.

Figure 3:
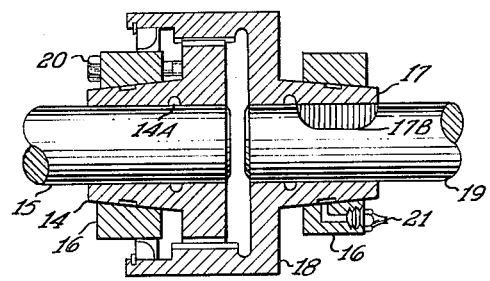
FIGURE 3 is a diagrammatic cross section presentation of the invention applied to the hubs of a gear coupling and depicting various modifications.

It should be noted that in all the illustrative presentations the locking means has been depicted as applied to a machine member which usually rotates with a shaft; this however is only the more common application. The securing means has equal application to non-rotating machine devices or members and it is intended to cover all such applications of the invention. In FIGURE 3 the securing means has been depicted as applied to the hubs of shaft connecting gear type couplings. The points of interest which differ from the preceding examples are as follows.

Hub 18 which is secured to the shaft by radial forces developed between ring 16 and hub tapered portion 17 has been assembled with the assistance of hydraulic pressure applied thru fitting 21. The hydraulic pressure is employed to expand the ring 16 and to apply a film of fluid between the ring 16 and the tapered portion of hub 18 to float the ring up or down the tapered surfaces of the hub 18. The ring is provided with the usual set of holes to accommodate the bolts 20 which provide a means to move the taper bored ring 16 up the hub on the oil or fluid film. The left hand half of the coupling has the same hub securing components i.e., tapered hub portion 14, ring 16, fitting 21 and mounts on shaft 15. In addition to the modified means of assembly of the securing means the hubs have an internal groove 14A to provide greater flexure to the hubs conical section. Said internal groove 14A has been positioned to provide the required reduction in wall section area and to maintain the non stress concentrating radial load distribution on the shafts 15 and 19 as depicted in the load distribution diagram 17B in FIGURE 3.

Figure 4:
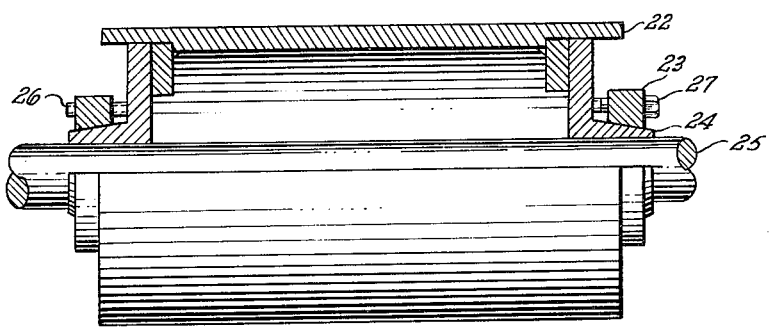
FIGURE 4 is an illustrative quarter section of the invention as applied to multiple hubs of a roll or cylinder.

FIGURE 4 depicts the application of the hub securing means as applied to support a roll on a shaft. In this construction the securing means is employed in multiple to the same machine member in contrast to the above disclosed applications which in FIGURE 1 depicted the securing means applied singly to a nonintegral machine element, in FIGURE 2 the securing means applied to an integral machine element with the securing means constructed to provide twice the locking effort by employing the means in parallel, double locking configuration, and in FIGURE 3 the securing means is applied to coacting machine members wherein the coacting machine members employ the securing means. The embodiment disclosed in FIGURE 4 portrays how the securing means may be applied in multiple to support a single machine element.

In FIGURE 4 hubs 24 mount on shaft 25 and are locked to the shaft by the force developed advancing ring 23 up the conical surface of the hub 24 with screws 27. The assembly is released from the locked or secured status by employing jack screws 26 to displace the ring 23 from the hub 24.

Referring to FIGURE 5 a hub of a machine member comprising a cam and gear 47 is provided with thin walled sections 42 and 44 having continuous inner peripheries to accept shaft 43 and continuous and tapered outer peripheries 42A and 44A to accept the rings 40 and 41. Ring 40 has a plurality of threaded holes to coact with the threaded portion denoted 49 of the differential screws 39 and the hub 47 has threaded holes to coact with the other threaded portion 48 of the differential screws 39. These screws may be employed as described in the foregoing paragraphs to move the ring 40 on to or off the continuous and tapered outer periphery of the hub section 42. Ring 41 is provided with a plurality of holes to accept the headed bolts 45 which are threaded into tapped holes 46 in the hub 47. These bolts 45 are designed to draw the ring 41 onto the continuous and tapered outer periphery of the hub section 44.

In the following claims our use of the word "tapered" is intended to cover both surfaces with a constant rate of increase in diameter as in a cone and surfaces with non linear rates of change in diameter as for example, an hourglass surface. In the description and claims the usage of the word shaft is intended to include any physical body with a cylindrical outer surface and therefore includes journals, tubes, rings, drums, pipes, rolls etc. The usage of the word hub is intended to include the physical body that circumscribes a shaft along the length of shaft that is supporting the machine element. The word ring is intended to include any physical body which has a round bore and may have any length and/or external geometry. By machine member or element we intend to include any one of two or more components which function together for a useful purpose.

What is claimed is:

1. A means for securing the hub of a machine member to a shaft, said means comprising, in combination, at least one thick walled ring having a continuous tapered inner periphery; said hub of a machine member having an annular thin walled section for each said thick walled ring, each said thin walled section having a continuous inner periphery to accept said shaft with a free sliding fit and a continuous and tapered outer periphery to accept a thick walled ring; wherein the tapered inner periphery of each said ring contacts and engages a continuous and tapered outer periphery of a thin walled section of said hub located therein with sufficient force to cause radial deflection of the thin walled section of said hub resulting in high pressure contact of said hub's contracted inner periphery with the periphery of said shaft located therein, thereby axially and torsionally securing said hub to said shaft.

2. A means for securing the hub of a machine member to a shaft, said means according to claim 1 and comprising, in combination therewith, an individual positioning means to gradually and infinitely displace each said thick walled ring upon a continuous and tapered outer periphery of a thin walled section of said hub to adjust the magnitude of said high pressure contact securing said thin walled section's continuous inner periphery to the periphery of said shaft located therein.

3. A means for securing the hub of a machine member to a shaft, said means comprising, in combination, at least one thick walled ring having a continuous tapered inner periphery, said hub of a machine member having an annular thin walled section for each said thick walled ring, each thin walled section having a continuous inner periphery to accept said shaft with a free sliding fit and a continuous and tapered outer periphery to accept a thick walled ring, said thin walled section having an axial length greater than the length of said tapered inner periphery of said ring coacting therewith wherein the tapered inner periphery of said ring contacts and engages a continuous and tapered outer periphery of a thin walled section of said hub located therein with sufficient force to cause radial deflection of said thin walled section of said hub resulting in high pressure contact of said hub's contracted inner periphery with the periphery of said shaft located therein, said high pressure contact having a load distribution pattern which gradually increases from zero to a maximum, remaining at the maximum value along the greater portion of the secured length on said shaft's periphery, and then gradually decreases from the maximum value to zero; thereby axially and torsionally securing said hub to said shaft.

4. A means for securing the hub of a machine member to a shaft, said means comprising, in combination, at least one thick walled ring having a continuous tapered inner periphery, said hub of a machine member having an annular thin walled section for each said ring, each said thin walled section having a continuous inner periphery to accept said shaft with a free sliding fit and a continuous and tapered outer periphery to accept each said thick walled ring; a means to displace each said ring upon said continuous and tapered outer periphery of said thin walled section, each said displacing means providing gradual adjustment and infinite positioning of each said ring relative to a coacting thin walled section of said hub; whereby the tapered inner periphery of said ring contacts and engages the continuous and tapered outer periphery of a thin walled section located therein with sufficient force to effect radial deflection of the thin walled section of said hub resulting in high pressure contact of said hub's contracted inner periphery with the periphery of said shaft located therein, thereby axially and torsionally securing said hub to said shaft.

5. A means for securing a machine member to a shaft, said means comprising, in combination, at least one hub having a thin walled section with a continuous and tapered outer periphery and a continuous inner periphery to accept said shaft with a free sliding fit; a thick walled ring for each said hub, said ring having a continuous tapered inner periphery to accept said continuous and tapered outer periphery of said hub; means to displace said ring upon said continuous and tapered outer periphery wherein the tapered inner periphery of said ring contacts and engages the continuous and tapered outer periphery of said hub located therein with sufficient force to cause radial deflection of the thin-walled section of said hub resulting in a high pressure contact of said hub's contracted inner periphery with the periphery of said shaft located therein, thereby axially and torsionally securing said hub of said machine member to said shaft.

References Cited by the Examiner

UNITED STATES PATENTS

| | | | |
|---|---|---|---|
| 98,144 | 12/69 | Buckman | 287—52.06 |
| 364,537 | 6/87 | Miller | 287—52.06 |
| 850,030 | 4/07 | Mellinger | 287—112 X |
| 1,291,475 | 1/19 | Geist et al. | |
| 2,564,670 | 8/51 | Bratt. | |
| 2,640,716 | 6/53 | Bigelow | 285—341 |
| 2,710,762 | 6/55 | Whitaker | 287—52.06 |
| 2,816,125 | 12/57 | McCloskey | 287—52.04 |
| 2,840,339 | 6/58 | Harless et al. | 287—53 |
| 2,973,654 | 3/61 | Ewing | 287—52.06 X |

FOREIGN PATENTS 15,752   1893   Great Britain.

CARL W. TOMLIN, *Primary Examiner.*

MORRIS M. FRITZ, WALTER A. SCHEEL,
*Examiners.*